United States Patent Office 2,788,029
Patented Apr. 9, 1957

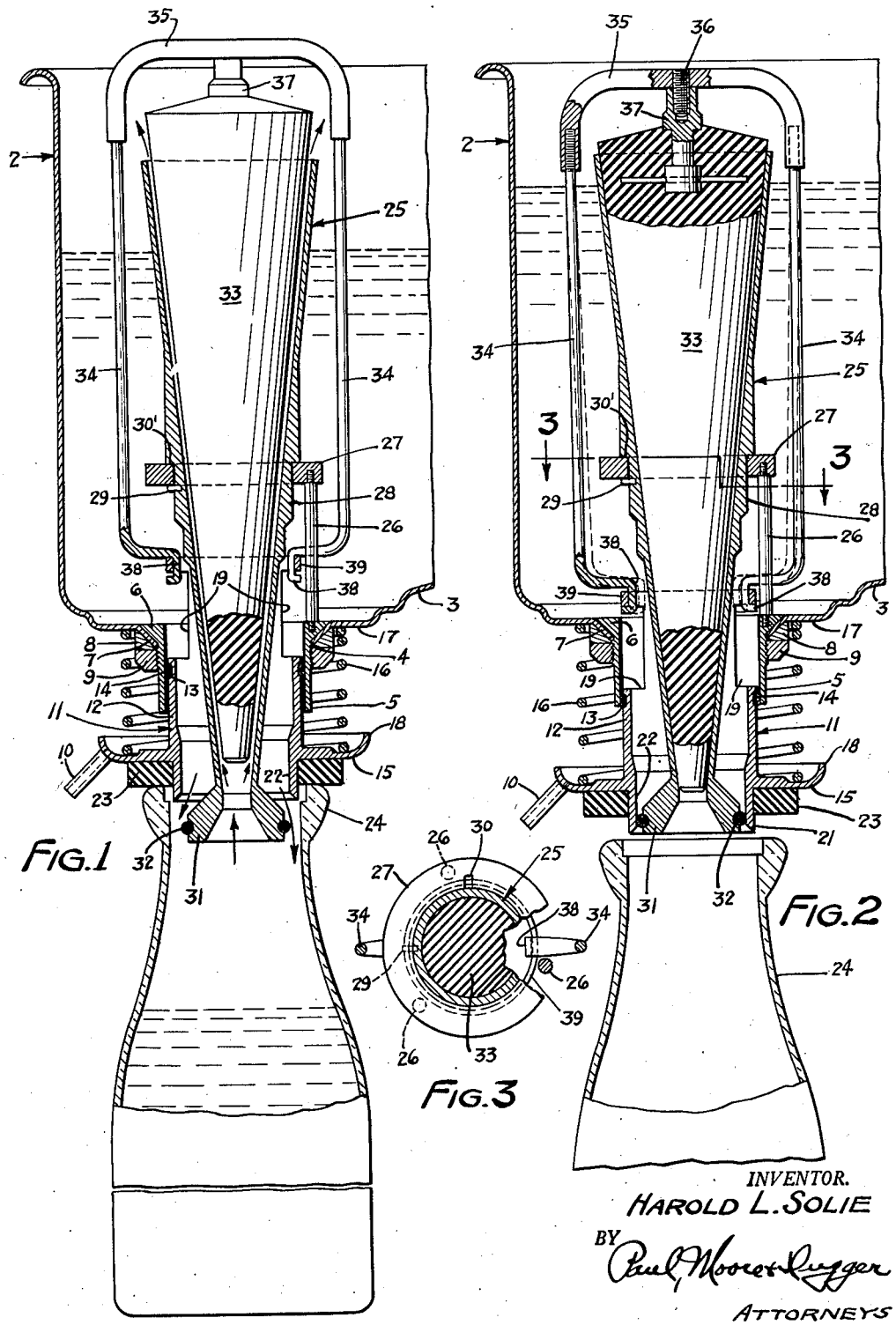

2,788,029

APPARATUS FOR FILLING BOTTLES

Harold L. Solie, Minneapolis, Minn.

Application August 31, 1953, Serial No. 377,385

12 Claims. (Cl. 141—86)

This invention relates to new and useful improvements in apparatus for filling bottles, and more particularly, milk bottles.

Bottle fillers, now commonly used in creameries and other bottle-filling stations, have not proven entirely satisfactory in operation. When filling a bottle, it is necessary that means be provided for venting the interior of the bottle to the atmosphere during the filling operation so that the atmospheric air contained in the bottle may escape therefrom as the liquid or milk is introduced into the bottle. Bottle filling machines are therefore usually provided with a vent tube which is adapted to open when the top of a bottle to be filled is brought into engagement with the usual filler sleeve or nozzle of the filling machine, so that the air within the bottle may readily escape to the atmosphere during the filling operation.

One of the objectionable features of conventional bottle filling machines is that a portion of the milk usually rises up into the air tube at the termination of the filling operation, which milk may become trapped in the tube when the lower end of the tube is closed by disengagement of the bottle from the filler sleeve or nozzle. Such trapping of a portion of the milk in the air or vent tube obviously is objectionable, particularly when the filling operation of the bottles is interrupted for a period of time, because the milk thus trapped within the air tube may be contained therein until the filling operation is again resumed, whereupon it is discharged or dumped into the first bottle filled following resumption of the filling operation. Also, when the air tube thus partially fills with milk at the termination of each filling operation, air may not escape from the next succeeding bottle, when milk is initially introduced thereinto, until the milk trapped within the air tube has been drained into the bottle to clear the air tube for air flow.

One of the important features of the present invention therefore is to provide an apparatus for filling bottles and the like, wherein the air or vent tube and its tapered closure plug are so constructed and associated with the filler sleeve and nozzle, that at the termination of each filling operation, the tapered plug in the air or vent tube completely closes the air tube and thus ejects or squeezes out any milk which may have entered the air tube during each filling operation, means also being provided for automatically opening the vent tube to the atmosphere when the next succeeding bottle is applied to the filler nozzle to receive a charge.

A further object of the invention resides in the unique construction of the air tube and its mounting within the tank, whereby it may readily be detached therefrom when desired.

A further object is to provide an apparatus for filling milk bottles and the like, comprising a filler sleeve having a nozzle at its lower end arranged to be inserted into a bottle for the purpose of delivering milk thereto, and a tapered air tube being mounted in the tank, and having its lower end extending downwardly into the filler sleeve in axial alignment therewith, said tapered tube having a tapered closure plug mounted for vertical movement therein, and so associated with the filler sleeve, that when the apparatus is in its normal inoperative position, the tapered plug is in closing engagement with the walls of the bore in the tapered air tube to prevent milk from entering thereinto, and when an empty bottle is applied to the lower end of the filler sleeve or nozzle and upwardly moves the sleeve in its guide, said tapered plug is moved slightly upwardly in the air tube to provide an annular air passage between its periphery and the wall of the air tube so that air confined within the bottle may readily escape upwardly through the air tube, when displaced by the delivery of milk into the bottle from the nozzle at the lower end of the filler sleeve.

Other objects of the invention reside in the novel means provided for detachably securing the tapered air tube in position within the tank; in the novel means provided for supporting the tapered plug in spaced relation to the walls of the air tube, when a bottle is applied to the nozzle at the lower end of the filler sleeve to receive a charge of milk from the tank; in the valve means provided at the lower end of the tapered air tube for closing and sealing the nozzle against milk flow, when the bottle is disengaged from the filler tube or nozzle; in the O-ring form of sealing means utilized at the lower end of the tube for closing the nozzle between filling operations; and in the simple and inexpensive construction of the apparatus, as a whole, which comprises few operating parts, and all such parts being readily accessible for thorough cleaning and sterilizing after use, a highly desirable feature in apparatus of this general type.

These and other objects of the invention and the means for their attainment will be more apparent from the following description taken in connection with the accompanying drawing.

In the accompanying drawing there has been disclosed a structure designed to carry out the various objects of the invention, but it is to be understood that the invention is not confined to the exact features shown, as various changes may be made within the scope of the claims which follow.

In the drawings:

Figure 1 is a vertical sectional view showing a portion of the tank of a conventional bottle filling machine with the invention applied thereto, the lower end of the filler sleeve being shown in open position, as when filling a bottle;

Figure 2 is a similar view, but showing the filler sleeve in its lower normally closed position, wherein the tapered plug in the air tube is seated against the wall of the air tube to completely close said tube; and Figure 3 is a detail sectional view on the line 3—3 of Figure 2, showing the means for detachably securing the tapered funnel-like air tube in position within the tank.

In the selected embodiment of the invention herein disclosed, there is illustrated in Figures 1 and 2, for purposes of disclosure, a portion of a conventional filling and capping machine comprising a tank, generally designated by the numeral 2, shown having a bottom wall 3 provided with a fluid discharge opening 4 having a tubular guide member 5 secured therein, for purposes subsequently to be described.

The tubular guide member 5 is shown provided with a beveled head 6 adapted to be seated against a conical flange 7 of the tank bottom 3, which defines the opening 4. A suitable clamping and packing gland 8 is seated against the bottom side of the conical flange 7, and is clampingly engaged therewith by manipulation of an annular clamping nut 9, received in threaded engagement with the tubular guide member 5.

Slidably mounted within the tubular guide 5 is a filler sleeve, generally designated by the numeral 11. The filler sleeve has a cylindrical portion 12 having a snug sliding fit in the tubular guide 5. The cylindrical portion 12 is shown provided with an annular groove 13 adapted to receive a conventional O-ring packing element 14, which engages the bottom of the groove 13 and the wall of the bore of the tubular guide 5 to prevent leakage of the liquid or milk from the tank 2 between these parts.

The lower end of the filler sleeve 11 is shown provided with a horizontal circular flange 15 which provides a seat for a suitable spring 16, the upper end of which is seated against the bottom wall portion 17 of the tank 2. The spring 16 thus constantly urges the filler sleeve 11 downwardly into its normal closed position, shown in Figure 2. The flange 15 has an up-turned peripheral flange 18, whereby it also provides, in effect, a shallow drip pan into which condensate accumulating on the exterior surface of the filler tube may drain to prevent such condensate from entering the open tops of the bottles. The member 15 may be provided with a suitable drain tube 10, as shown in Figure 2.

The upper end portion of the sleeve 11 extends up into the tank 2 and is shown having opposed fluid passages 19 therein. It will also be noted that the upper end of the sleeve 11 is open to permit free flow of milk from the tank therethrough, as well as through the openings 19, when the lower end of the sleeve is open during each bottle-filling operation.

The lowermost end portion of the filler sleeve 11 below the horizontal flange element 15 constitutes, in effect, a nozzle 21 which is formed with a reduced cylindrical bore 22. A suitable resilient sealing element 23 embraces the nozzle 21 and has its upper face engaging the bottom face of the horizontal flange 15. The bottom face of the sealing element 23 is adapted to be engaged by the top edge of the bottle top 24, as illustrated in Figure 1, during each bottle-filling operation.

In an apparatus of this general type, it is necessary to provide means for venting the interior of the bottle during the filling operation, whereby the atmospheric air within the bottle may escape therefrom as milk or other liquid is being introduced into the bottle from the nozzle 21 of the filler sleeve 11.

To thus allow the air within the bottle to escape to the atmosphere, a tapered air tube 25 is shown mounted within the tank 2 and has its lower reduced end portion extending downwardly into the filler sleeve 11 in axial alignment therewith, as shown in Figures 1 and 2. The tapered air tube is supported in fixed relation to the tank by a plurality of fixed upright rods 26, having an annulus 27 secured to their upper ends adapted to removably receive the cylindrical portion 28 of the air tube 25.

To retain the air tube 25 in position in the annulus 27, a radially disposed lock pin 29 is secured in the periphery of the cylindrical portion 28 of the air tube at an elevation just below the bottom face of the annulus 27, as shown in Figures 1 and 2. The pin 29 is receivable in a slot or keyway 30 provided in the bore of the annulus 27, when inserting the air tube into the annulus, as will be understood by reference to Figure 3. The air tube 25 has an annular shoulder 30' for engaging the upper surface of the annulus 27, as shown, thereby to position it at the correct elevation relative to the filler sleeve 11. When the air tube is thus positioned in the annulus 27, it is relatively rotated therein to move the lock pin 29 out of register with the notch or keyway 30 in the annulus, whereby the air tube is locked against axial movement in the tank 2.

From the foregoing, it will be noted that the tapered air tube is detachably supported within the tank in the position shown in Figures 1 and 2. The air tube 25 is shown provided at its lower end with a valve head 31 having a peripheral groove therein for receiving an annular O-ring sealing element 32 adapted to sealingly engage the wall of the cylindrical bore 22 in the nozzle 21, thereby to prevent fluid flow from the filler sleeve 11, when the bottle is detached from the nozzle, as shown in Figure 2.

Another feature of the invention resides in the means provided for closing the tapered air tube 25 and removing excess milk therefrom each time a bottle top is removed from the nozzle 21, following each bottle-filling operation. Such means is shown comprising a tapered plug 33, the taper of which corresponds to the taper of the bore in the air tube 25, so that when the plug is in its closed position, shown in Figure 2, its periphery will engage the wall of the air tube 25 and thus squeeze out any milk which may have entered the air tube during the filling operation.

Means is provided for lifting the plug 33 into open position to permit free flow of air from the bottle to the atmosphere, as indicated by the arrows in Figure 1, during each filling operation. The means provided for thus bodily lifting the plug 33 from closed to open position is shown comprising a pair of upright rods 34 having their upper ends secured to the ends of a crossmember 35 having its intermediate portion secured to the top end of the plug 33 by such means as a stud 36 secured in a fitting 37 shown embodied in the upper end of the tapered plug 33. The tapered plug 33 may be made of molded rubber, if desired.

The legs 34 are provided at their lower ends with U-shaped terminal portions 38 which are interlocked with the upper portions 38 of the filler sleeve 11, as shown in Figures 1 and 2. The spacing between the horizontal portions of the U-shaped terminals 39 is relatively greater than the width of the upper portions 39 of the filler sleeve 11, whereby the sleeve 11 has limited movement relatively to the tapered plug 33. Thus, the actuation of the plug 33 is accomplished automatically by movement of the filler sleeve 11 from its normal inoperative position, shown in Figure 2, to its bottle-filling position shown in Figure 1. When the filled bottle is disengaged from the nozzle 21 at the lower end of the filler sleeve, the valve head 31 enters the lower end of the filler sleeve 11 and closes the nozzle 21 to interrupt fluid flow therefrom. Simultaneously, the tapered plug 33 is lowered into closing engagement with the wall of the tapered air tube 25, thereby squeezing out any milk which may have entered the air tube during the bottle-filling operation.

In the bottle-filling machine herein disclosed, the empty bottles are successively delivered to a position beneath the filler tube 11, as shown in Figure 2, by suitable means not shown in the drawings. As each bottle is axially aligned with the nozzle 21, a suitable mechanism, not shown in the drawings, automatically elevates each bottle into filling engagement with the nozzle 21 of the filler tube 11 from the position shown in Figure 2 to that shown in Figure 1, whereupon the valve head 31 is moved out of the bore 22 of the nozzle 21 and thus permits milk to freely flow from the filler tube into the bottle, as indicated by the arrows in Figure 1.

At the same instant, the upper portions 39 of the filler sleeve engage the upper horizontal portions of the U-shaped terminals 38 of the arms 34, whereby the plug 33 is elevated into open position to provide an annular air passage between the periphery thereof and the wall of the bore in the air tube for the free passage of air from the bottle to the atmosphere, as clearly indicated by the arrows in Figure 1. When the bottle has received its full charge, it is automatically lowered out of engagement with the sealing element 23, whereupon the filler tube 11 returns to its normal inoperative position shown in Figure 2. At the same time, the plug 33 is lowered into closing engagement with the wall of the air tube 25, as a result of the downward movement of the filler sleeve, which, when it reaches the position shown in Figure 2, is restricted from further downward movement by the action of the U-shaped terminals 38 of the rods 34 of the plug 33, as will be understood by reference to Figure 2.

When the plug 33 thus returns to its seated position within the air tube 25, it squeezes from the air tube, all milk which may have entered therein during each bottle-filling operation, and closes the air tube until the next bottle to be filled is moved into filling engagement with the nozzle 21.

From the foregoing, it will be noted that any milk entering the air tube 25 during the filling operation is completely ejected therefrom as the filler sleeve 11 returns to its normal closed position, because of the tapered plug 33 also returning to its closed position in the tube 25, as shown in Figure 2, thus squeezing out all milk contained in the tube. This is a highly desirable feature, in that it assures complete and thorough venting of each bottle as the milk is initially introduced thereinto from the filler tube.

The manipulation of the plug 33 from its normal closed position, shown in Figure 2, to its open position shown in Figure 1, and vice versa, is accomplished automatically by the up and down movement of the filler sleeve 11 in the guide 5 by the movement of each bottle into and out of engagement with the sealing element 23. The upper end of the plug 33 is preferably conical as shown in Figures 1 and 2, to prevent any milk from lodging therein during operation of the machine.

The entire apparatus is extremely simple and inexpensive, both in construction and operation. Sanitation is a highly essential requirement in the operation of a milk bottling machine of this general type. Therefore, the parts of the machine which directly contact any portion of the milk must be so constructed and arranged that they may readily be disassembled or taken apart to facilitate cleaning and sterilizing. The present machine was designed with this in mind, and presents the utmost in simplicity.

When a bottling period has been completed, and the tank 2 has been emptied of its contents, the operator simply lifts the tapered plug 33 from the tapered air tube 25 by flexing the rods 34 inwardly sufficiently to disengage the U-shaped terminals 38 thereof from the upper portions 39 of the filler sleeve 11, as indicated by the dotted lines in Figure 2, after which the plug 33 may be withdrawn from the tube 25. Such disengagement of the terminals 38 with the portions 39 of the filler sleeve, also effects the release of the filler sleeve, whereby it may be withdrawn from its tubular guide 5, as will readily be understood by reference to Figures 1 and 2.

The tapered air tube 25 is also readily removable from the supporting annulus 27 in the tank, by relatively rotating the tube in the annulus to bring the lockpin 29 into register with the slot or keyway cut in the bore of the annulus. Thus, all of the parts for controlling the flow of milk from the tank into the bottles, including the tapered plug 33, tapered air tube 25, and filler sleeve 11, may be quickly detached from the tank for cleaning and sterilizing without the use of tools.

The foregoing detailed description has been given for clearness of understanding only, and no unnecessary limitations should be understood therefrom, but the appended claims should be construed as broadly as permissible in view of the prior art.

I claim as my invention:

1. In an apparatus of the class described, a tank having a bottom wall, an upright tubular guide secured to said bottom wall in leaktight relation, a filler sleeve vertically slidable in said guide and having its upper portion in constant communication with the interior of the tank, said sleeve having a nozzle at its lower end receivable in the open top of a bottle to be filled, sealing means carried by said nozzle for engaging the top end of the bottle to seal the connection between the nozzle and the bottle top, when the bottle is moved upwardly from its normal lowered position into bottle-filling position, a tapered vent tube in the tank for venting the bottle during the filling operation, an elongated tapered plug within the vent tube normally closing said tube, said plug engaging a substantial portion of the length of the wall of said tube, when in closed position, whereby any milk which may have entered the tube during the filling operation is returned to the bottle, and means made operable by movement of the filler sleeve into bottle-filling position to automatically unseat the vent tube closure means and permit air in the bottle to escape to the atmosphere through the vent tube, when a liquid is introduced into the bottle.

2. An apparatus according to claim 1, wherein the tapered vent tube is detachably mounted in the tank.

3. An apparatus according to claim 1, wherein an annular sealing element is carried by the lower end of the vent tube for engaging and closing the nozzle, when the filler sleeve is returned to its normal lowered position, upon completion of each filling operation.

4. An apparatus according to claim 1, wherein the tapered vent tube has an operative connection with the filler sleeve whereby said plug is alternately moved into closing and opening positions by relative movement of the filler sleeve, during each cycle of operation.

5. An apparatus according to claim 4, wherein the tapered vent tube is provided at its lower end with an enlarged head arranged to close the nozzle at the lower end of the filler sleeve against liquid flow from the tank, when the filler sleeve is in its normal inoperative closed position.

6. An apparatus according to claim 5, wherein an annular horizontal member is provided on the lower end portion of the filler sleeve, and a spring is interposed between said horizontal member and the bottom of the tank for constantly urging the filler sleeve into its normal non-filling position.

7. In an apparatus of the class described, a tank having a bottom wall, an upright tubular guide secured to and depending from said bottom wall, a filler sleeve vertically slidable in said guide and having a nozzle at its lower end provided with a cylindrical bore, said nozzle being receivable in the open top of a bottle to be filled, an annular sealing element embracing the nozzle for engaging the bottle top to prevent leakage between the bottle and nozzle during each filling operation, an elongated tapered vent tube fixedly supported within the tank with its upper end disposed above the maximum level of the liquid in the tank, said vent tube having its lower end portion extending downwardly into the filler sleeve in axial alignment therewith, a valve head at the lower end of the vent tube engageable with the cylindrical bore in the nozzle to interrupt liquid flow from the tank, when the filler sleeve is in its lowered non-filling position, an elongated tapered plug within the vent tube normally engaging the walls thereof to close the vent tube when the filler sleeve is in non-filling position, the length of said plug being substantially equal to the length of the vent tube, and means operatively connecting the plug to the sleeve, whereby when the filler sleeve is moved upwardly in said guide to bottle-filling position, said plug is automatically elevated into open bottle-venting position simultaneously as the filler sleeve is moved into bottle-filling position.

8. An apparatus according to claim 7, wherein an O-ring sealing element is mounted on the valve head at the lower end of the vent tube for sealing the connection between the valve head and the cylindrical bore in the nozzle, when the nozzle is in non-filling position.

9. An apparatus according to claim 7, wherein the means for operatively connecting the plug to the filler sleeve comprises rod elements having their upper ends fixedly secured to the upper end of the plug, and having their lower ends interlocked with the filler sleeve in such a manner that when the sleeve is in its normal non-filling position, said sleeve will move said plug into closing engagement with the walls of the vent tube, and when the filler sleeve is elevated into bottle-filling position, said sleeve will automatically move said plug into open position to permit free air flow from the bottle during the filling operation.

10. In an apparatus for filling bottles, a tank having a bottom wall, an upright tubular guide secured to and depending from said bottom wall, a filler sleeve vertically slidable in said guide and having its upper portion projecting upwardly into the tank and in constant communication therewith, said sleeve having a cylindrical lower end portion providing a nozzle adapted to be received in the open top of an empty bottle, means for sealing the connection between the bottle top and the filler sleeve during the bottle-filling operation, said sleeve terminating at its lower end in a cylindrical bore, an elongated tapered air tube fixedly mounted within the tank and having its lower end extending downwardly into the filler tube, a valve head at the lower end of the air tube having a peripheral groove therein, a sealing element in said groove for sealing the connection between the valve head and said cylindrical bore portion to prevent leakage therebetween when the valve head is in closing engagement with said cylindrical bore, an elongated tapered closure plug in the air tube having a horizontal cross member secured to its upper end, said plug engaging the walls of the tube substantially the extent thereof; upright rod-like members having their upper ends secured to the opposed ends of said horizontal cross member, the lower ends of said rod-like members being interlocked with the filler sleeve, whereby when the filler sleeve is initially moved upwardly into bottle-filling position by engagement of a bottle top with the nozzle thereof, the cylindrical bore of said sleeve is moved out of closing engagement with the valve head at the lower end of the air tube to permit free flow of liquid from the tank into the bottle, and simultaneously said rod-like members will move said plug out of closing engagement with the wall of the tapered air tube to permit free flow of air from the bottle through said air tube to the atmosphere.

11. An apparatus according to claim 10, wherein means is provided on said rod-like members for limiting the downward movement of the filler sleeve in its guide, subsequent to the bottle-filling operation.

12. An apparatus according to claim 10, wherein means is provided on the filler tube for catching condensate which may accumulate on the exterior surface thereof.

References Cited in the file of this patent
UNITED STATES PATENTS

| | | |
|---|---|---|
| 288,744 | Lubbs et al. | Nov. 20, 1883 |
| 668,303 | Beyer et al. | Feb. 19, 1901 |
| 1,961,563 | Luckie | June 5, 1934 |
| 2,501,764 | Duer | Mar. 28, 1950 |